US009729949B2

(12) United States Patent
Winzer et al.

(10) Patent No.: US 9,729,949 B2
(45) Date of Patent: Aug. 8, 2017

(54) DYNAMIC LOCAL DECISION CONTROL IN SOFTWARE DEFINED NETWORKING-BASED ENVIRONMENT

(71) Applicant: Alcatel-Lucent USA Inc., Murray Hill, NJ (US)

(72) Inventors: Peter J. Winzer, Aberdeen, NJ (US); John E. Simsarian, Piscataway, NJ (US); Marina K. Thottan, Westfield, NJ (US); Kyle Guan, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 478 days.

(21) Appl. No.: 14/259,688

(22) Filed: Apr. 23, 2014

(65) Prior Publication Data

US 2015/0312658 A1    Oct. 29, 2015

(51) Int. Cl.
*H04J 14/00* (2006.01)
*H04Q 11/00* (2006.01)
(Continued)

(52) U.S. Cl.
CPC ......... *H04Q 11/0062* (2013.01); *H04L 45/22* (2013.01); *H04Q 11/0005* (2013.01);
(Continued)

(58) Field of Classification Search
CPC ......... H04L 45/22; H04L 45/28; H04L 45/12; H04L 69/40; H04L 45/64; H04L 45/00; H04L 47/07; H04Q 11/0005; H04Q 2011/0086; H04Q 11/0062; H04Q 2011/0041; H04Q 2011/0058;
(Continued)

(56) References Cited

U.S. PATENT DOCUMENTS

| 7,593,322 B2 * | 9/2009 | DeBoer | H04J 3/085 370/225 |
| 8,089,864 B2 * | 1/2012 | Beller | H04J 3/085 370/222 |

(Continued)

FOREIGN PATENT DOCUMENTS

WO  PCT/US2015/026182    8/2015

OTHER PUBLICATIONS

International Telecommunication Union, "Interfaces for the Optical Transport Network," Recommendation ITU-T G.709/Y.1331, Feb. 2012, 238 pages.

(Continued)

*Primary Examiner* — Hibret Woldekidan
(74) *Attorney, Agent, or Firm* — Ryan, Mason & Lewis, LLP

(57) ABSTRACT

Cross-layer information associated with a software defined networking-based (SDN-based) communication network is collected. One or more updates are sent to one or more network elements in the SDN-based communication network to control one or more local decisions made at the one or more network elements. The one or more updates are based on at least a portion of the collected cross-layer information. Preferably, the collecting and sending steps are performed by a controller implementing an SDN management plane associated with the SDN-based communication network.

23 Claims, 7 Drawing Sheets

(51) Int. Cl.
*H04L 12/707* (2013.01)
*H04L 12/703* (2013.01)
*H04L 12/715* (2013.01)

(52) U.S. Cl.
CPC .............. *H04L 45/28* (2013.01); *H04L 45/64* (2013.01); *H04Q 2011/0041* (2013.01); *H04Q 2011/0058* (2013.01); *H04Q 2011/0081* (2013.01); *H04Q 2011/0086* (2013.01)

(58) Field of Classification Search
CPC .......... H04Q 2011/0081; H04J 14/0294; H04J 14/0201; H04J 14/0227; H04J 2203/0053; H04J 2203/006; H04J 14/0295; H04J 14/0291; H04J 3/14; H04J 3/1652; H04B 10/032
USPC ................................. 398/1–8, 10, 25, 27, 57
See application file for complete search history.

(56) References Cited

U.S. PATENT DOCUMENTS

| | | | | |
|---|---|---|---|---|
| 8,358,929 | B2* | 1/2013 | Lewis | H04J 14/0227 398/12 |
| 8,830,825 | B2* | 9/2014 | Addanki | H04L 49/351 370/225 |
| 8,913,481 | B2* | 12/2014 | Akyamac | H04J 14/0284 370/216 |
| 8,934,771 | B2* | 1/2015 | Smolorz | H04Q 11/0067 398/15 |
| 9,161,106 | B2* | 10/2015 | Sun | H04Q 11/0062 |
| 2002/0188756 | A1* | 12/2002 | Weil | H04L 41/0668 709/240 |
| 2008/0175587 | A1* | 7/2008 | Jensen | H04L 1/22 398/2 |
| 2009/0285574 | A1* | 11/2009 | Liu | H04J 3/1652 398/2 |
| 2010/0103937 | A1* | 4/2010 | O'Neil | G06N 3/126 370/392 |
| 2011/0261825 | A1* | 10/2011 | Ichino | H04L 45/38 370/400 |
| 2015/0365193 | A1* | 12/2015 | Connolly | H04L 41/0803 398/52 |

OTHER PUBLICATIONS

International Telecommunication Union, "Characteristics of Optical Transport Network Hierarchy Equipment Functional Blocks," Recommendation ITU-T G.798, Dec. 2012, 390 pages.

International Telecommunication Union, "Architecture of Optical Transport Networks," Recommendation ITU-T G.872, Oct. 2012, 52 pages.

F. Paolucci et al., "OpenFlow-Based Flexible Optical Networks with Enhanced Monitoring Functionalities," 38th European Conference and Exhibition on Optical Communications (ECOC), OSA, Sep. 2012, 3 pages.

A. Sgambelluri et al., "OpenFlow-Based Segment Protection in Ethernet Networks," IEEE/OSA Journal of Optical Communications and Networking, Sep. 2013, pp. 1066-1075, vol. 5, No. 9.

A.B. De Souza et al., "A Management Scheme of SRLG-Disjoint Protection Path," IFIP/IEEE International Symposium on Integrated Network Management (IM), Jun. 2009, pp. 553-560.

G. Markidis et al., "Routing and Wavelength Assignment Algorithms in Survivable WDM Networks Under Physical Layer Constraints," 5th International Conference on Broadband Communications, Networks and Systems (BROADNETS), Sep. 2008, pp. 191-196.

J.E. Simsarian et al., "Cross-Layer Aware Software Defined Networking in an IP Over Optical Transport Network," Advanced Photonics for Communications, OSA, Paper NT4C.2, Jul. 2014, 3 pages.

F. Fidler et al., "Impairment-Aware Optical Networking Using Cross-Layer Communication," IEEE/OSA Journal of Optical Communications and Networking, Feb. 2013, pp. 144-158, vol. 5, No. 2.

\* cited by examiner a)

b)

| NETWORK<br>NODE NUMBER | INPUT PORT 1 TRAFFIC<br>(IP LAYER) | INPUT PORT 1 BER<br>(OTN LAYER) |
|---|---|---|
| 1 | 5 Gb/s | $1 \times 10^{-6}$ |
| 2 | 7 Gb/s | $2 \times 10^{-10}$ |
| 3 | 2 Gb/s | $4 \times 10^{-5}$ |

LOGIC FOR INTELLIGENT PROTECTION OF PATH 1

LOGIC FOR SOFT FAILURE OF PATH 1

US 9,729,949 B2

DYNAMIC LOCAL DECISION CONTROL IN SOFTWARE DEFINED NETWORKING-BASED ENVIRONMENT

FIELD

The application relates generally to communication networks, and more particularly to techniques implementing local decision control functionality in such communication networks.

BACKGROUND

Software defined networking (SDN) is a network architecture concept that decouples network control from the underlying network switching infrastructure so as to enable network control to become directly programmable thus allowing the underlying network infrastructure to be abstracted for applications and network services running on the network. An SDN controller is used to manage flow control in an SDN-based network. For example, SDN controllers are typically based on protocols, such as the Open-Flow™ (Open Networking Foundation) protocol, that allow control servers to instruct network elements (e.g., switches) where to send packets. The SDN controller serves as a kind of operating system for the SDN-based network. By separating the control plane (and management plane) from the network hardware and running the control plane instead as software, the SDN controller facilitates automated network management, as well as integration and administration of applications.

While an SDN controller maintains global visibility of the SDN-based network, there are networking functions that are not necessarily able to take advantage of such global visibility. One example of such a networking function is protection switching in a short time window (e.g., less than 50 milliseconds) following a link failure in an optical communication network. However, due to network complexity and required signaling, as well as due to inherent propagation delays between network elements and an SDN controller with a global network view, it is impractical for an existing SDN management and control plane to respond on such a small timescale.

Furthermore, protection paths are typically statically provisioned in an optical communication network, irrespective of traffic flows and the possible best-effort usage of paths that are reserved for high-priority protection in the case of link failures. This static protection path allocation may not allow for optimal or substantially optimal protection path selection as network traffic changes over time. Conversely, querying an SDN controller real-time in the event of a link failure can be too time consuming for reliable link protection.

SUMMARY

Illustrative embodiments of the invention provide local decision control functionality for use in a communication network. While embodiments are applicable to varied types of communication networks, one or more embodiments are particularly well-suited for use in an SDN-based optical transport network environment.

In one embodiment, a method includes the following steps. Cross-layer information associated with a software defined networking-based (SDN-based) communication network is collected. One or more updates are sent to one or more network elements in the SDN-based communication network to control one or more local decisions made at the one or more network elements. The one or more updates are based on at least a portion of the collected cross-layer information.

Preferably, the collecting and sending steps are performed by a controller implementing an SDN management plane associated with the SDN-based communication network.

Advantageously, illustrative embodiments provide for the combination of dynamic network operation and fast local action of network elements. In one example, illustrative embodiments enable the dynamic choice of protection paths for high-priority traffic. Existing solutions require operator intervention to make changes to the protection paths, which is known to be a costly solution. In contrast, illustrative embodiments of the invention use cross-layer information from an SDN management plane to automatically determine the best operation parameters of a network that are then implemented locally, allowing for fast action. In another example, illustrative embodiments enable protective migration of traffic from a first path to a second path, for example, at the occurrence of a reduction in an operating margin in the first path due to a physical-layer impairment.

These and other features and advantages of the present invention will become more apparent from the accompanying drawings and the following detailed description.

DETAILED DESCRIPTION

Figure 1:
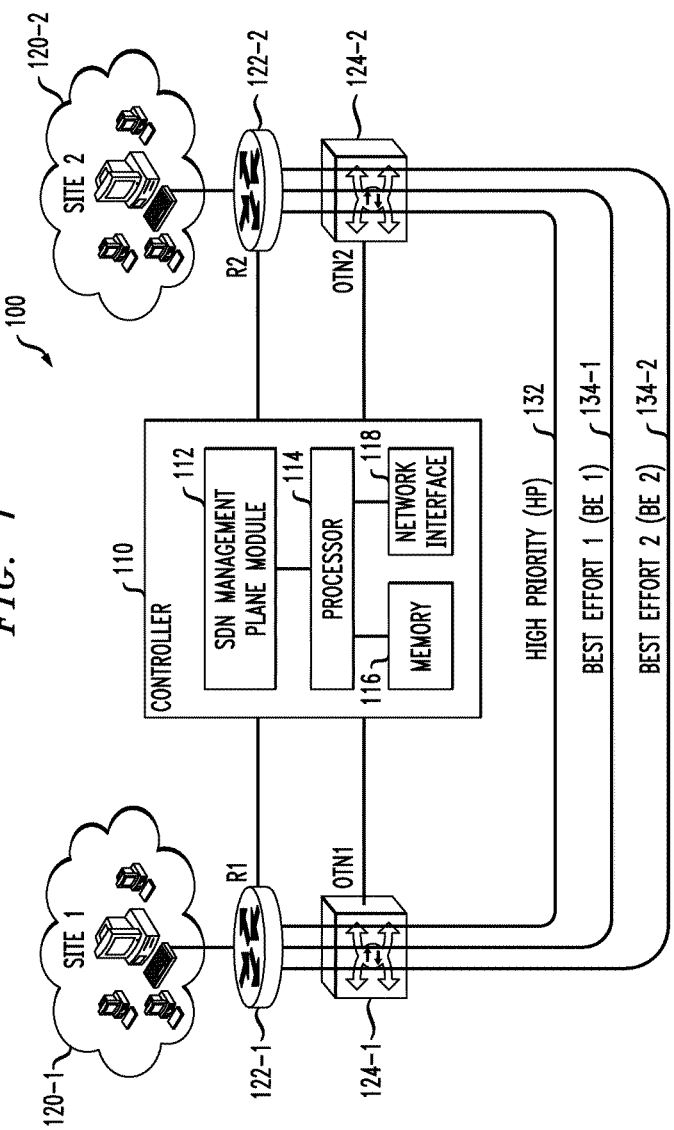
FIG. 1 shows a communication system which includes software defined network management plane control of protection path selection according to an embodiment of the invention.

Illustrative embodiments of the invention will be described herein with reference to exemplary communication systems, networks, user devices, network nodes, network elements, and associated communication protocols. For example, illustrative embodiments are particularly well-suited for use in an SDN-based optical transport network environment. However, it should be understood that embodiments of the invention are not limited to use with the particular arrangements described, but are instead more generally applicable to any communication network application and environment in which it is desirable to provide improved performance by providing local decision control functionality. Further, while one example of local decision control described herein comprises protection path switching, it is to be understood that network functionality to which one or more embodiments of the invention can be applied is not so limited.

As mentioned above in the background section, due to network complexity and required signaling, as well as due to inherent propagation delays between network elements and an SDN controller with a global network view, it is impractical for an existing SDN management plane to respond on small timescales (e.g., less than 50 milliseconds). Further, querying an SDN controller real-time in the event of a link failure can be too time consuming for reliable link protection.

To address these and other issues, illustrative embodiments of the invention provide for an SDN management plane, implemented as part of an SDN controller, with global network visibility to periodically update parameters on the local networking elements in response to the traffic and condition of the network so that the networking elements can then detect and react to an event such as a link failure rapidly and locally, but at the same time with a global and quasi-real time view of the network. This approach allows both dynamic optimization of the network operation and fast, local response when needed. This approach is illustrated herein with the example of dynamic, traffic-aware protection-path selection. That is, an exemplary solution enables the dynamic choice of a protection path for high-priority traffic. Existing solutions require operator intervention to make changes to the protection paths, which would be much more costly than the present solution. Advantageously, this approach uses cross-layer information for an SDN management plane to automatically determine the best (e.g., substantially optimal or optimal) operation parameters of a network that are implemented locally, allowing for fast action.

As used herein, the phrase "cross-layer information" generally refers to information associated with two or more layers in a communication network. By way of example only, embodiments of the invention provide for collecting information from elements operating at two or more Open System Interconnection (OSI) model layers such as network layer 3 (e.g., IP routers), data link layer 2 (e.g., switches) and physical layer 1/0 (e.g., optical crossconnect circuits/wavelengths). However, embodiments of the invention are not limited to this particular conceptual layer framework.

FIG. 1 shows a communication system which includes software defined network management plane control of protection path selection according to an embodiment of the invention. As shown in communication system 100, a first computing site 120-1 is operatively coupled to a second computing site 120-2. A "computing site" generally refers to a grouping of one or more processing devices (e.g., servers, client devices, laptops, personal computers, smart phones, cellular phones, sensors, and other mobile or fixed computing devices) that are configured to communicate (e.g., exchange data) with another grouping of one or more processing devices. In this example, each site has an Internet Protocol (IP) layer (gateway) router, R1 (122-1) and R2 (122-2), respectively. The routers are coupled to an underlying optical transport network (OTN) comprising optical-layer crossconnects 124-1 (OTN1) and 124-2 (OTN2) and optical links 132, 134-1, and 134-2, that are configured to carry communication wavelengths. In this example, it is assumed that a high-priority (HP) path 132 is to be protected with one of two best effort links 134-1 (BE1) or 134-2 (BE2). Note also that while illustrative embodiments described herein relate to Internet Protocol (IP) over an OTN, alternative embodiments relate to other communication and network protocols, by way of example only, IP over Wavelength-Division Multiplexing (WDM) technology.

As is well known, OTN is an optical communication architecture described in detail by the Telecommunication Standardization Sector of the International Telecommunications Union in standards such as, for example, ITU-T G.709, G.798, and G.872, the disclosures of which are incorporated by reference herein in their entireties. However, it is to be appreciated that embodiments of the invention are not intended to be limited to any particular such standards.

As further shown in FIG. 1, an SDN controller 110 is operatively coupled to the R1, R2, OTN1, and OTN2. The SDN controller 110 comprises an SDN management plane module 112, a processor 114, a memory 116, and a network interface 118. The SDN management plane module 112 is configured to perform the SDN controller functions described herein under programmatic control of the processor 114 in coordination with the memory 116 and the network interface 118, as will be described below.

The processor 114 may comprise a microprocessor, a microcontroller, an application-specific integrated circuit (ASIC), a field-programmable gate array (FPGA) or other type of processing circuitry, as well as portions or combinations of such circuitry elements.

The memory 116 may comprise random access memory (RAM), read-only memory (ROM) or other types of memory, in any combination. The memory 116 and other memories disclosed herein may be viewed as examples of what are more generally referred to as "processor-readable storage media" storing executable computer program code or other types of software programs. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. The processor 114 loads the computer program code from the memory 116 (and/or internal memory) and executes the code to provide the functionalities and methodologies described herein.

The network interfaces 118 comprise network interface circuitry that allows the SDN controller 110 to communicate over the communication system 100 with the network elements shown therein (e.g., R1, R2, OTN1, and OTN2). Such network interface circuitry may comprise, for example, one or more conventional transceivers. Each of the network elements may similarly incorporate processor, memory and network interface elements of the type described above.

The controller 110, sites 120, and network elements 122 and 124 may comprise a common processing platform or multiple separate processing platforms. It should be understood that the particular modules and other components implemented in the communication system 100 as illustrated in FIG. 1 are presented by way of example only. In other embodiments, only subsets of these components, or additional or alternative sets of components, may be used, and such components may exhibit alternative functionality and configurations. A wide variety of other arrangements of hardware and associated software or firmware may be used in implementing embodiments of the invention. Furthermore, while FIG. 1 illustrates two sites, two IP layer routers, and two optical-layer crossconnects in this particular example, the SDN controller 110 can be configured in a straightforward manner, given the teachings provided herein, to control more sites and/or more network elements. Note also that the processor 114 and memory 116 are one example of a "processing device." However, such a processing device may comprise other components described herein and not expressly described herein.

In accordance with illustrative embodiments, the SDN management plane module 112 (or, more generally, the SDN controller 110) with global and cross-layer visibility of the network state frequently updates certain parameters stored locally within network elements. These parameters then influence rapid local decisions at the node (such as protection switching). Since these parameters are based on quasi-real time information on the network state, fast local decisions based on a global network view can be implemented.

As an example, consider the problem of dynamically selecting protection paths based on current network traffic conditions. It is assumed that high-priority traffic between two important locations has a designated "working path" and at least two possible "protection paths," which are used for best-effort traffic in the absence of network failure. In case of a failure on the working path, the task of the network is to switch to the "currently preferred" protection path, where "currently preferred" could mean the path that currently carries less best-effort traffic, or the path that currently exhibits a more stable physical-layer performance.

Illustrative embodiments propose the dynamic provisioning of the protection path, where the SDN management plane module 112 periodically updates information on the preferred protection path based on real-time traffic information and real-time physical-layer information of the network. To implement this function, the SDN management plane module collects traffic state information from the IP-layer routers (R1 and R2) and physical layer impairment information from the OTN/optical-layer equipment (OTN1 and OTN2). The SDN management plane module 112 then updates the protection paths assignments locally in the OTN/optical-layer equipment (OTN1 and OTN2) in order to enable fast switch-over at any given point in time. Alternatively, if protection is being implemented at the IP layer with a multi-protocol label-switched (MPLS) fast reroute, for example, then the protection path for a label-switched path could be updated in the IP layer.

Thus, as shown in FIG. 1 and as mentioned above, assume we are interested in protecting the high-priority (HP) path 132 with one of the best effort links 134-1 (BE1) or 134-2 (BE2). The SDN management plane module 112 builds a map of the network including elements at layer 3 (IP routers), layer 2 (switches) and layer 1/0 (OTN crossconnect circuits/WDM wavelengths). It is this cross-layer and global awareness that allows the SDN management plane module 112 to optimize the total network operation, including selection of the best protection paths for HP traffic.

The traffic on BE1 and BE2 is monitored by the SDN management plane module 112 by requesting the port traffic from R1 and R2 and analyzing the traffic statistics for the ports connected to BE1 and BE2. In the particular example shown, it is assumed that the link traffic on BE1 and BE2 is the same as the router port traffic, since there is a one-to-one mapping between port traffic and link traffic. Once the traffic on the paths has been determined, the SDN management plane module 112 selects the link with the lower traffic according to a predetermined algorithm (an example of which will be described below) and updates the protection path for the HP link, which is stored locally in the OTN1 and OTN2 crossconnects, or in any other node equipment along the way when using span-wise protection.

In the example of FIG. 1, assume that BE1 is determined to be the link with the lowest traffic, and is hence designated as the protection link for the HP traffic. Other information than "lowest utilization" may be used by the SDN management plane module 112 as well to decide which protection link to use. For example, the bit error ratio (BER) of the two BE links before forward error correction (FEC) may be measured and a link may not be used as a HP backup path if its pre-FEC BER is above a certain threshold. Note that the pre-FEC BER is just one example of a physical-layer performance parameter that can be used as a measure. However, in alternate embodiments of physical-layer performance parameters, readings from a coherent digital signal processing (DSP) engine can be used such as, by way of example only, polarization variations, polarization-mode dispersion levels, chromatic dispersion variations, optical power levels, optical signal-to-noise ratio levels, etc.

Figure 2:
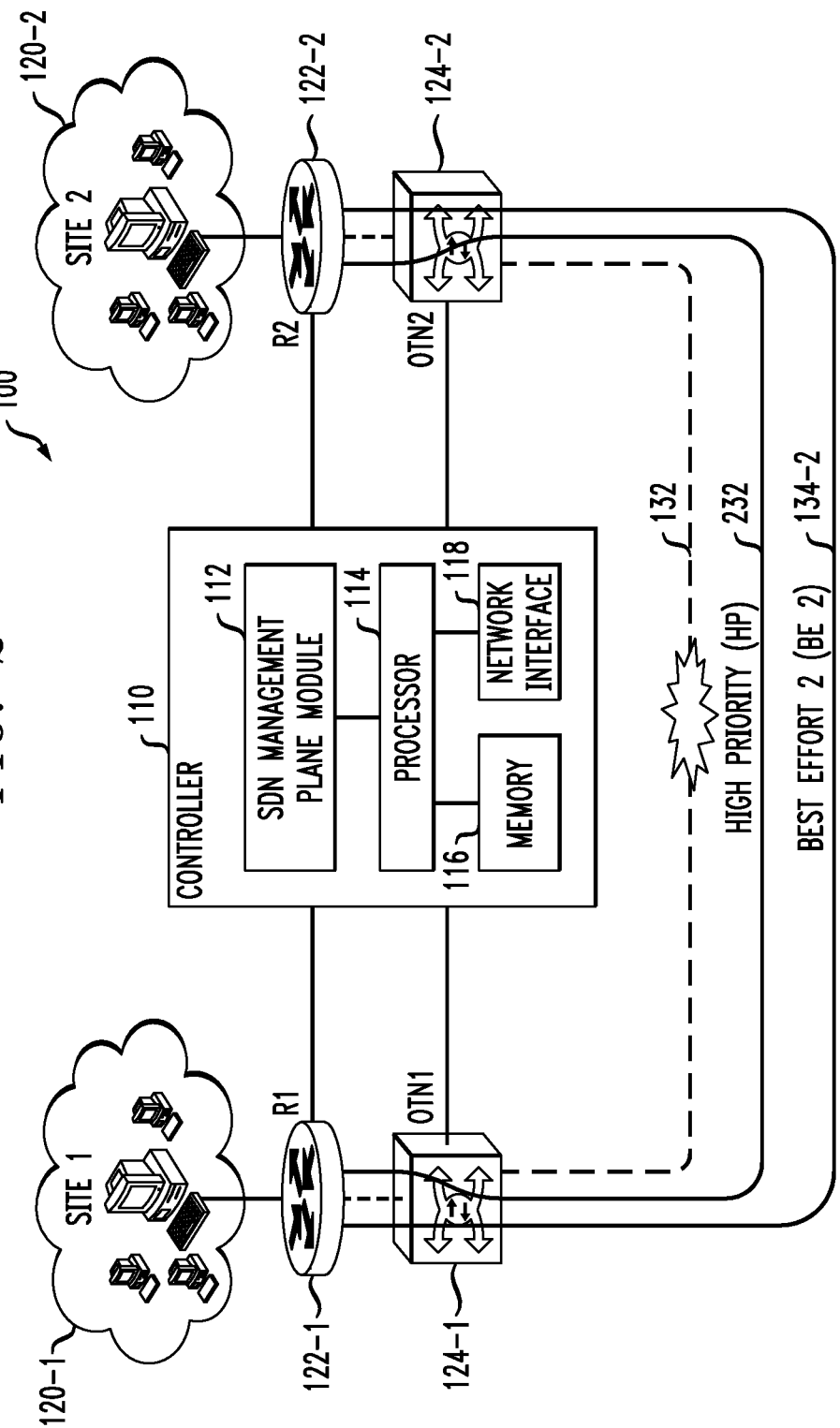
FIG. 2 shows the communication system of FIG. 1 with a high priority link failure according to an embodiment of the invention.

In the event of a failure of the HP link 132, as illustrated in FIG. 2 (which illustrates the communication system 100 shown in FIG. 1 but with a link failure on HP path 132), protection signaling occurs between OTN1 and OTN2, which triggers a protection switching event in OTN1 and OTN2. The best effort traffic on BE1 (134-1 in FIG. 1) is lost in order to move the traffic from HP 132 to BE1 to restore the link. The restored link and the new HP path is designated as 232 in FIG. 2 (which corresponds to 134-1 in FIG. 1). It is to be appreciated that the SDN management plane module 112 is not necessarily used in the restoration event itself because it is not optimized for the speed required in commercial networks, such as sub-50 millisecond restoration after the failure occurs. The typical protection signaling and switching of the optical network is used to restore the link in the required time.

After the protection event occurs, the network elements (R1, R2, OTN1, and OTN2) signal their new configuration(s) back to the SDN management plane module 112, and the SDN management plane module 112 updates its network maps with the new network state. The SDN management plane module 112 can then analyze the new network state to select the best protection path for the HP traffic. In the present example, the next-best choice would now be BE2 (134-2) for the protection path of the HP link.

One advantage of this illustrative embodiment over the present mode of operation (PMO) networks is that the SDN management plane module 112 is configured to adapt to dynamic network behavior. In this example, the traffic on BE1 and BE2 or its physical-layer stability may change over time so that the SDN management plane module 112 may decide that BE2 is a "currently preferred" path and therefore selects BE2 as the protection path for HP. In PMO networks, the protection path is statically set by the network operator and it is impractical for a network operator to manually check the traffic on the routers and update the protection path due to the number of connections and complexity of optical networks. The automated aspect of the SDN management plane module 112 implementing this process incurs far less operation costs than a manual implementation based on operator intervention.

Figure 3:
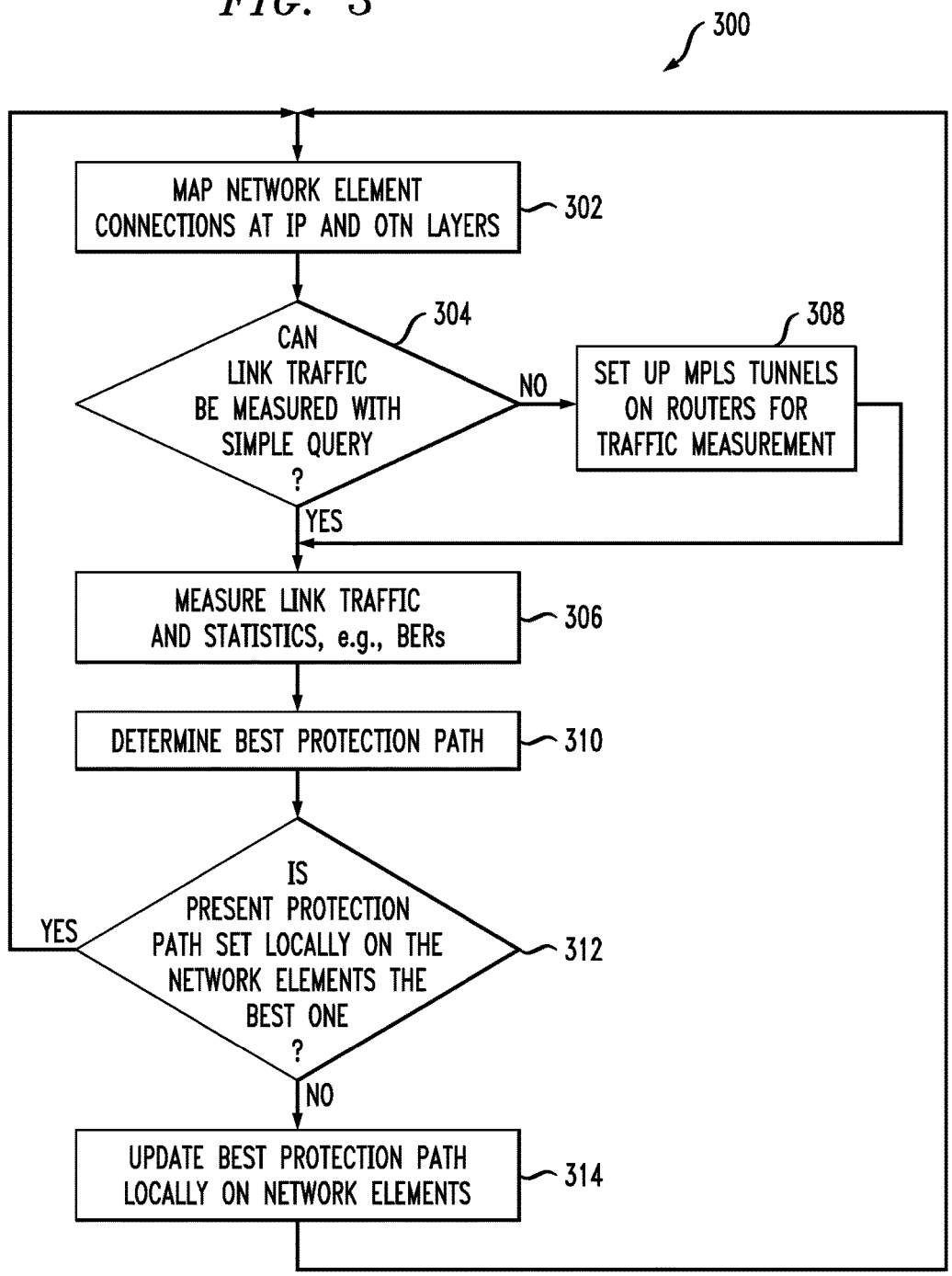
FIG. 3 shows a software defined network management plane control methodology according to an embodiment of the invention.

FIG. 3 shows a software defined network management plane control methodology according to an embodiment of the invention. More particularly, FIG. 3 shows a flow chart of exemplary actions taken by the SDN management plane module 112 (or, more generally, the SDN controller 110) for the above example process. Note that the exact algorithm is flexible since the "software" in software-defined networking refers to the fact that the logic and functionality of the management plane can be programmed with a more "open" interface than systems presently offer. For example, the equipment vendors can provide application programming interfaces (APIs) for the network elements, thereby enabling third parties, including the network operators, to program the SDN management plane functionality described herein.

In the event that there is not a one-to-one mapping between router ports and links, the task of determining the traffic on the link can be more complex. For example, several router ports could be mapped onto a single link. In such a case, the traffic is monitored by the SDN management plane module 112 creating a transport entity such as an MPLS path that acts as a transport container for the traffic on the link. The SDN management plane module 112 then requests the traffic statistics for the MPLS path from the routers, which simplifies the task of traffic measurement.

As shown in step 302 of methodology 300, the SDN management plane module 112 maps network element connections at the IP and OTN layers. In step 304, the module 112 determines whether or not optical link traffic can be measured with a simple query. If yes, in step 306, the module 112 measures link traffic and statistics, e.g., BER. If not, in step 308, the module 112 sets up MPLS tunnels, as mentioned above, on routers for traffic measurement, then measures link traffic and statistics, e.g., BER, in step 306. It is to be appreciated that decision box 304 could alternately, or additionally, check whether PHY (Physical layer) parameters can be measured, and if so, such measurements can be taken and used for protection path determination. This would be useful in scenarios where router traffic cannot be measured.

In step 310, the SDN management plane module 112 determines the best protection path, as described in examples above. In step 312, the module 112 determines whether or not the present protection path set locally on the network elements is the best one. If yes, the methodology 300 returns to step 302 and repeats. If no, then in step 314, the module 112 updates the best protection path locally on the network elements. The methodology then returns to step 302 and repeats.

Figure 4:
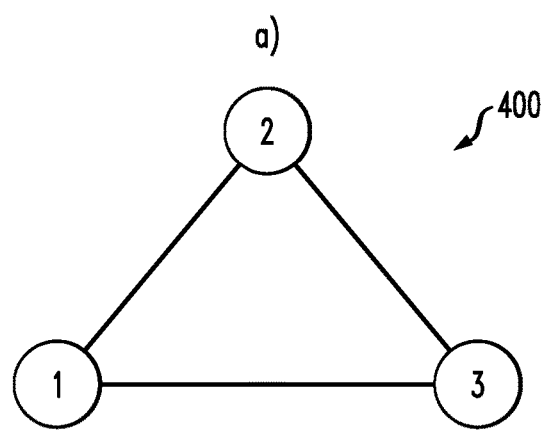
FIGS. 4A and 4B show an example of cross-layer information collected according to an embodiment of the invention.

FIGS. 4A and 4B show an example of cross-layer information collected according to an embodiment of the invention. Recall that the collection step is performed by the SDN management plane module 112 (FIG. 1). Collection can be an active step performed by the module 112 where the module expressly requests the information and/or collection can be a passive step where the network elements periodically send the information to the module without an express request.

In this simplified example, FIG. 4A shows a three node (i.e., network element) network 400, while FIG. 4B shows a table 410 containing the collected information. It is to be understood, however, that embodiments of the invention can be implemented in networks with more or less nodes. In the particular example shown, it is assumed that there is a one-to-one mapping between router port traffic and link traffic (e.g., Input Port 1 traffic at IP layer and Input Port 1 traffic at OTN layer).

As shown in table 410, by way of example, the SDN management plane module 112 collects information (e.g., statistics) from network node 1 indicating a 5 Gb/s (Gigabits per second) traffic rate at Input Port 1 at the IP layer and a BER of $1 \times 10^{-6}$ at Input Port 1 at the OTN layer. Similar statistics are collected for network nodes 1 and 2.

Figure 5:
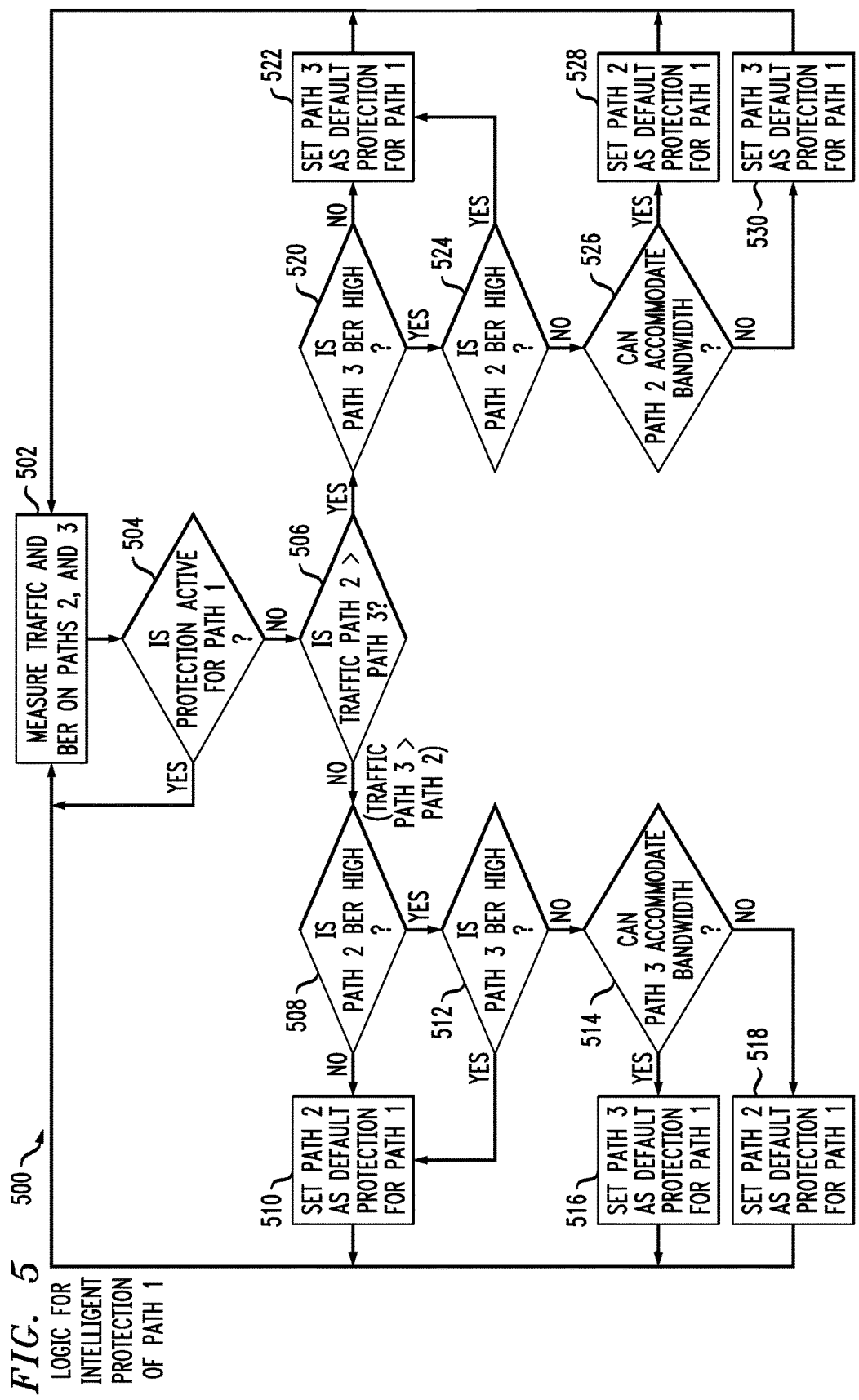
FIG. 5 shows a methodology for protection path selection for a hard failure according to an embodiment of the invention.

Once the traffic statistics on the paths has been determined, as described above, the SDN management plane module 112 selects the link with the lower traffic according to an algorithm such as that illustratively shown in FIG. 5. It is assumed in path protection methodology 500 shown in FIG. 5 that "path 1" is the HP path 132 and "path 2" and "path 3" are BE1 134-1 path and BE2 134-2 path (FIG. 1A), respectively. It is to be understood, however, that embodiments of the invention can be implemented in networks with more or less paths.

In step 502, the methodology measures traffic and BER on paths 2 and 3. If protection is active for path 1 in step 504 (i.e., traffic has been switched onto one of the protection paths chosen for path 1), then the methodology returns to step 502. If no, in step 506, the methodology determines whether traffic in path 2 is greater than traffic in path 3. If no, then in step 508, the methodology determines whether path 2 BER is high (i.e., above a predetermined BER threshold). If no, then path 2 is set as the default protection path for path 1 in step 510. However, if path 2 BER is high (step 508), then in step 512, the methodology determines whether path 3 BER is high (i.e., above a predetermined BER threshold). If yes, then path 2 is set as the default protection path for path 1 (step 510). If path 3 BER is not high (step 512), then step 514 determines whether path 3 can accommodate traffic bandwidth. If yes, then path 3 is set as the default protection path for path 1 in step 516; and if no, then path 2 is set as the default protection path for path 1 in step 518.

Returning to step 506, if it is determined that traffic in path 2 is greater than traffic in path 3, then the methodology determines in step 520 whether path 3 BER is high (i.e., above a predetermined BER threshold). If no, then path 3 is set as the default protection path for path 1 in step 522. However, if path 3 BER is high (step 520), then in step 524, the methodology determines whether path 2 BER is high (i.e., above a predetermined BER threshold). If yes, then path 3 is set as the default protection path for path 1 (step 522). If path 2 BER is not high (step 524), then step 526 determines whether path 2 can accommodate traffic bandwidth. If yes, then path 2 is set as the default protection path for path 1 in step 528; and if no, then path 3 is set as the default protection path for path 1 in step 530.

Note that while the methodology 500 does not expressly show the case at step 506 where traffic in path 2 and path 3 are exactly equal, it is to be understood that this case can be handled in a straightforward manner by the methodology comparing the BERs between the two paths and then determining the appropriate default protection path in a similar manner as shown in FIG. 5.

Illustrative embodiments of the invention described above involve updating the protection path via the SDN controller for a link in the case of a "hard" failure, where the HP path has been rendered incapable of reliably transmitting data. An example of a hard failure to a fiber link is the rapid severing of the fiber. Then, the HP traffic is switched within 50 milliseconds to the protection path. However, embodiments of the invention are also applicable to the case of "soft" failures. A link with a soft failure is still able to carry traffic, but the operating margin has been reduced due to physical-layer impairments. For example, assume that the pre-FEC BER exceeds an adjustable threshold value. This is one example of a soft failure. According to illustrative embodiments of the invention, the SDN controller detects the soft failure and then migrates HP traffic away from the impaired link to another available link with a greater operating margin. One exemplary advantage of this method is that the traffic can be migrated to the new link without losing any data during the switchover, which is not generally achievable following a hard failure. In the case of a soft failure, the SDN controller may decide to migrate some or all of the traffic on the link depending on the priority of the traffic. For example, if a link is carrying both high-priority and best effort traffic, the SDN controller may decide to only migrate the high-priority traffic to the new link. An illustrative algorithm for determining the path to which to migrate traffic due to a soft failure is shown in FIG. 6.

Figure 6:
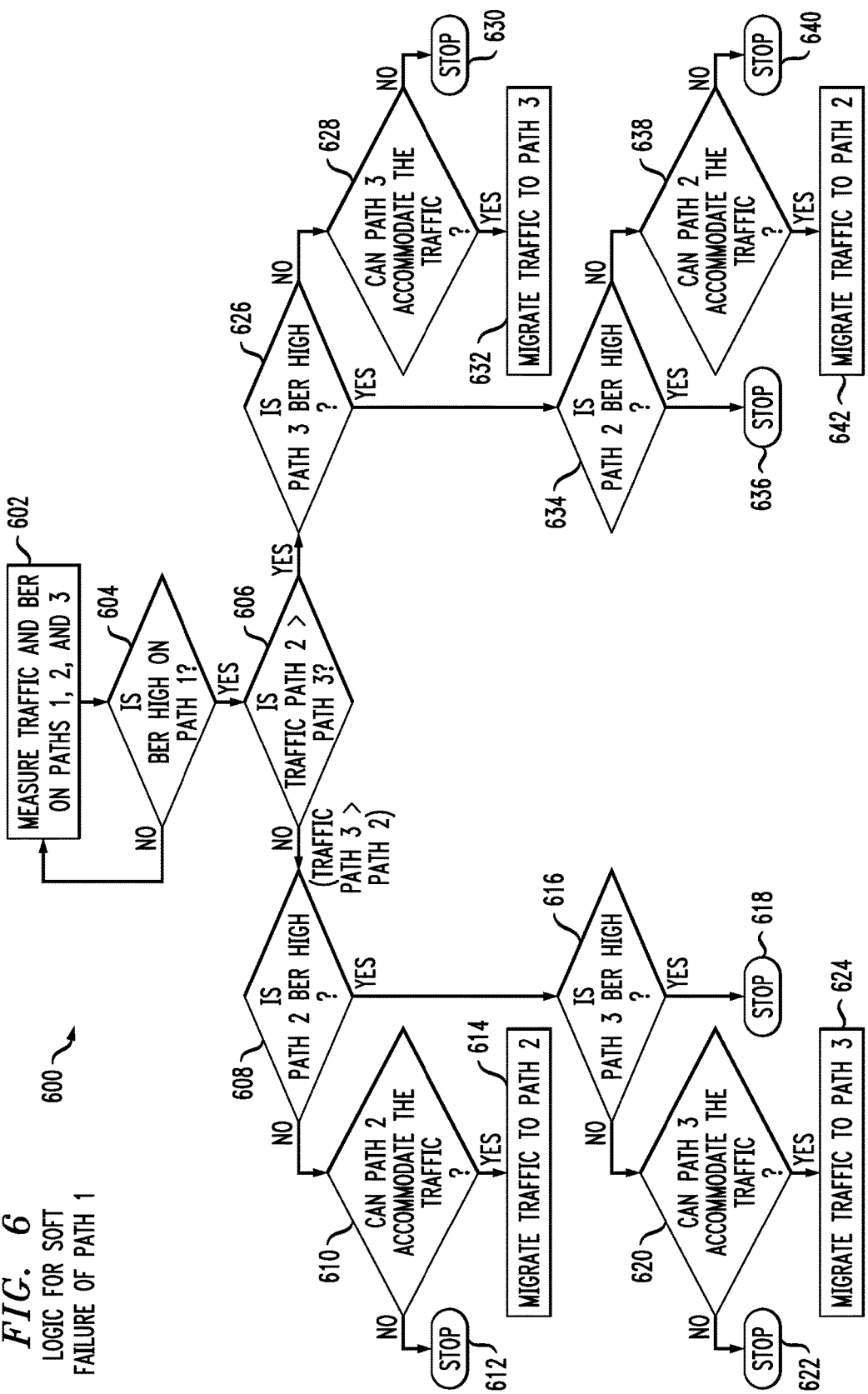
FIG. 6 shows a methodology for protective migration of traffic due to a soft failure according to an embodiment of the invention.

It is assumed in protective migration methodology 600 shown in FIG. 6 that "path 1" is the HP path 132 and "path 2" and "path 3" are BE1 134-1 path and BE2 134-2 path (FIG. 1A), respectively. It is to be understood, however, that embodiments of the invention can be implemented in networks with more or less paths. Also, as mentioned above, HP path 132 may be carrying both high-priority traffic and best effort traffic.

In step 602, the methodology measures traffic and BER on paths 1, 2 and 3. In step 604, the methodology determines whether path 1 BER is high (i.e., above a predetermined BER threshold). If path 1 BER is not high, then the methodology returns to step 602. If path 1 BER is high, in step 606, the methodology determines whether traffic in path 2 is greater than traffic in path 3. If not, then in step 608, the methodology determines whether path 2 BER is high (i.e., above a predetermined BER threshold). If not, then in step 610 the methodology determines whether path 2 can accommodate traffic from path 1 (at least some path 1 traffic, e.g., high-priority traffic). If path 2 cannot accommodate path 1 traffic, then the methodology stops (takes no further action) at block 612. If path 2 can accommodate path 1 traffic, then in step 614 the methodology migrates path 1 traffic to path 2.

Returning to step 608, if path 2 BER is high, then in step 616 the methodology determines whether path 3 BER is high (i.e., above a predetermined BER threshold). If path 3 BER is high, then the methodology stops at block 618. If path 3 BER is not high, then in step 620 the methodology determines whether path 3 can accommodate traffic from path 1 (at least some path 1 traffic, e.g., high-priority traffic). If path 3 cannot accommodate path 1 traffic, then the methodology stops at block 622. If path 3 can accommodate path 1 traffic, then in step 624 the methodology migrates path 1 traffic to path 3.

Returning to step 606, if traffic in path 2 is greater than traffic in path 3, then in step 626, the methodology determines whether path 3 BER is high (i.e., above a predetermined BER threshold). If not, then in step 628 the methodology determines whether path 3 can accommodate traffic from path 1 (at least some path 1 traffic, e.g., high-priority traffic). If path 3 cannot accommodate path 1 traffic, then the methodology stops at block 630. If path 3 can accommodate path 1 traffic, then in step 632 the methodology migrates path 1 traffic to path 3.

Returning to step 626, if path 3 BER is high, then in step 634 the methodology determines whether path 2 BER is high (i.e., above a predetermined BER threshold). If path 2 BER is high, then the methodology stops at block 636. If path 2 BER is not high, then in step 638 the methodology determines whether path 2 can accommodate traffic from path 1 (at least some path 1 traffic, e.g., high-priority traffic). If path 2 cannot accommodate path 1 traffic, then the methodology stops at block 640. If path 2 can accommodate path 1 traffic, then in step 642 the methodology migrates path 1 traffic to path 2.

Note that while the methodology 600 does not expressly show the case at step 606 where traffic in path 2 and path 3 are exactly equal, it is to be understood that this case can be handled in a straightforward manner by the methodology comparing the BERs between the two paths and then determining the appropriate protective migration response in a similar manner as shown in FIG. 6.

Figure 7:
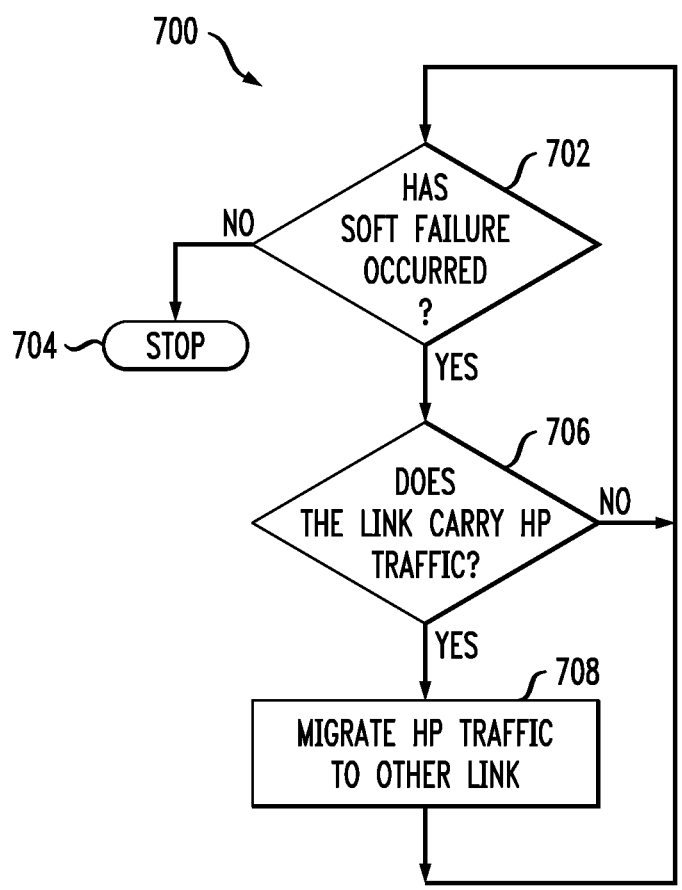
FIG. 7 shows a methodology for determining whether or not to migrate traffic due to a soft failure according to an embodiment of the invention.

FIG. 7 shows a methodology for determining whether or not to migrate traffic due to a soft failure according to an embodiment of the invention. In step 702, methodology 700 determines whether a soft failure occurred. If not, then the methodology stops (takes no further action) at block 704. If a soft failure occurred, the methodology at step 706 determines whether the link on which the soft failure occurred carries HP traffic. If not, the methodology returns to step 702. If yes, then the methodology in step 708 migrates the HP traffic to another link (e.g., determined in accordance with the methodology 600 in FIG. 6).

Although certain illustrative embodiments are described herein in the context of communication networks and systems utilizing particular communication protocols, other types of networks and systems can be used in other embodiments. As noted above, the term "network" or "system" as used herein is therefore intended to be broadly construed. Further, it should be emphasized that the embodiments described above are for purposes of illustration only, and should not be interpreted as limiting in any way. Other embodiments may use different types of network, system, device and module configurations, and alternative communication protocols, process steps and operations for implementing local decision control functionality. The particular manner in which the user devices and network nodes communicate can be varied in other embodiments. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising:
   collecting cross-layer information associated with a software defined networking-based communication network comprising an optical transport network, the cross-layer information comprising traffic state information from one or more of optical-layer devices and Internet Protocol-layer devices of the optical transport network; and
   sending one or more updates to one or more network elements in the software defined networking-based communication network to control one or more local decisions for designating protection path assignments locally in one or more of the optical-layer devices, wherein the one or more updates are based on at least a portion of the collected cross-layer information;
   wherein the method is performed by at least one processing device comprising a processor coupled to a memory; and wherein the collecting and sending steps are performed by a controller implementing a software defined networking management plane associated with the software defined networking-based communication network.

2. The method of claim 1, wherein one of the one or more local decisions comprises a protection path selection decision.

3. The method of claim 1, wherein the one or more updates sending step further comprises the controller updating one or more protection path assignments locally in one or more of the optical-layer devices to enable switch-over to an assigned protection path substantially immediately following a failure of a corresponding working path.

4. The method of claim 3, wherein the assigned protection path selected comprises a path that currently carries a least amount of best-effort traffic or a path that currently exhibits a most stable physical-layer performance.

5. The method of claim 3, wherein the assigned protection path selected comprises a path that does not have a physical-layer performance parameter above a given threshold value.

6. The method of claim 1, wherein the cross-layer information collecting step further comprises the controller building a network map of the optical transport network, wherein the network map at least comprises the optical-layer devices and the Internet Protocol-layer devices of the optical transport network.

7. The method of claim 6, wherein the cross-layer information collecting step further comprises the controller adjusting the network map following a network event resulting in implementation of at least one protection path.

8. The method of claim 7, wherein the cross-layer information collecting step further comprises the controller receiving notification of implementation of a path protection from at least one of the optical-layer devices.

9. The method of claim 7, wherein the one or more updates sending step further comprises the controller changing one or more of the protection path assignments locally in one or more of the optical-layer devices based on the adjusted network map.

10. The method of claim 1, wherein one of the one or more local decisions comprises a traffic migration decision, and further wherein the one or more updates sending step further comprises the controller updating at least one of the one or more network elements to migrate traffic from one path through which traffic is currently being transmitted to another path through which at least a portion of the traffic can be transmitted.

11. The method of claim 10, wherein the traffic selected to be migrated from the one path to the other path comprises high-priority traffic.

12. The method of claim 10, wherein the decision to migrate traffic is at least based on a reduction of an operating margin in the one path through which traffic is currently being transmitted due to a physical-layer impairment.

13. A non-transitory processor-readable storage medium having embodied therein executable program code that when executed by the processing device causes the processing device to perform the method of claim 1.

14. An apparatus comprising:
a memory; and a processor operatively coupled to the memory and configured to perform steps of: collect cross-layer information about a software defined networking-based communication network comprising an optical transport network, the cross-layer information comprising traffic state information from one or more of optical-layer devices and Internet Protocol-layer devices of the optical transport network; and
send one or more updates to one or more network elements in the software defined networking-based communication network to control one or more local decisions for designating protection path assignments locally in one or more of the optical-layer devices wherein the one or more updates are based on at least a portion of the collected cross-layer information;
wherein the collecting and sending steps are performed by a controller implementing a software defined networking management plane associated with the software defined networking-based communication network.

15. The apparatus of claim 14, wherein one of the one or more local decisions comprises a protection path selection decision.

16. The apparatus of claim 15, wherein the one or more updates sending step further comprises the controller updating one or more protection path assignments locally in one or more of the optical-layer devices to enable switch-over to an assigned protection path substantially immediately following a failure of a corresponding working path.

17. The apparatus of claim 16, wherein the assigned protection path selected comprises a path that currently carries a least amount of best-effort traffic or a path that currently exhibits a most stable physical-layer performance.

18. The apparatus of claim 16, wherein the assigned protection path selected comprises a path that does not have a physical-layer performance parameter above a given threshold value.

19. The apparatus of claim 14, wherein the cross-layer information collecting step further comprises the controller building a network map of the optical transport network, wherein the network map at least comprises the optical-layer devices and the Internet Protocol-layer devices of the optical transport network.

20. The apparatus of claim 14, wherein one of the one or more local decisions comprises a traffic migration decision, and further wherein the one or more updates sending step further comprises the controller updating at least one of the one or more network elements to migrate traffic from one path through which traffic is currently being transmitted to another path through which at least a portion of the traffic can be transmitted.

21. The apparatus of claim 20, wherein the traffic selected to be migrated from the one path to the other path comprises high-priority traffic.

22. The apparatus of claim 20, wherein the decision to migrate traffic is at least based on a reduction of an operating margin in the one path through which traffic is currently being transmitted due to a physical-layer impairment.

23. An apparatus comprising: a controller implementing a software defined networking management plane associated with a software defined network-based communication network, the controller being configured for: collecting cross-layer information about the software defined networking-based communication network comprising an optical transport network, the cross-layer information comprising traffic state information from one or more of optical-layer devices and Internet Protocol-layer devices of the optical transport network; and
sending one or more updates to one or more network elements in the software defined networking-based communication network to control one or more local decisions for designating protection path assignments locally in one or more of the optical-layer devices, wherein the one or more updates are based on at least a portion of the collected cross-layer information;
wherein the controller is implemented using at least one processing device comprising a processor coupled to a memory.

* * * * *